Jan. 14, 1964     F. W. LOY ET AL     3,117,736
WIRE WRAPPING DEVICE
Filed June 19, 1961     3 Sheets-Sheet 1
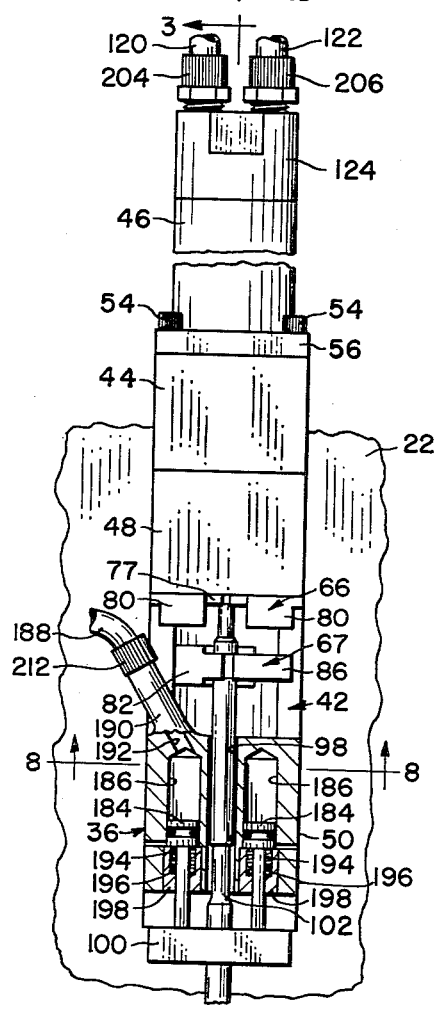
FIG. 1
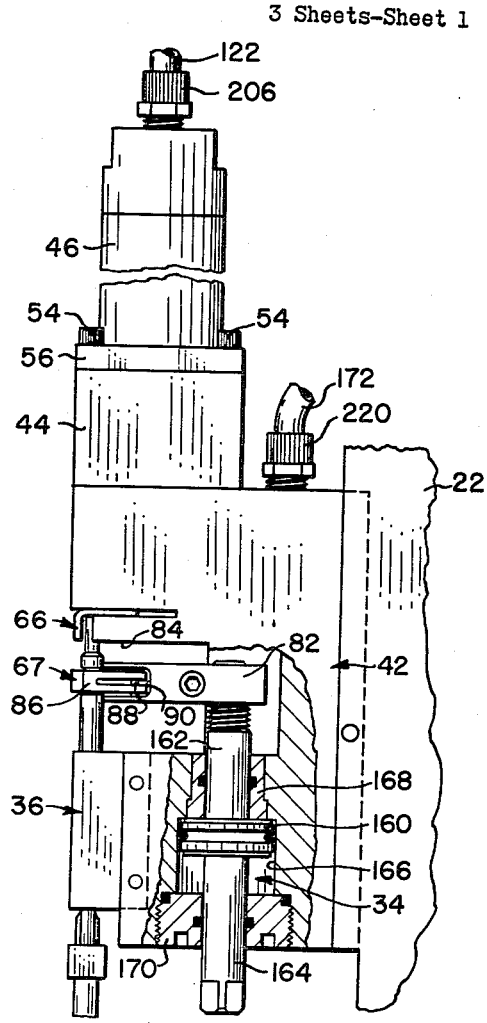
FIG. 2
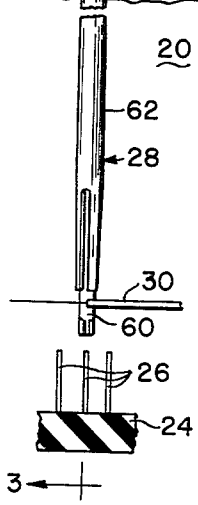
WILLIAM J. BAKER
FRED W. LOY
        INVENTORS
BY Joseph W. Holloway
      ATTORNEY Jan. 14, 1964    F. W. LOY ET AL    3,117,736
WIRE WRAPPING DEVICE Filed June 19, 1961    3 Sheets-Sheet 2

United States Patent Office 3,117,736
Patented Jan. 14, 1964

3,117,736
WIRE WRAPPING DEVICE
Fred W. Loy, Fruitland Township, Ottawa County, and William J. Baker, Spring Lake, Mich., assignors to Gardner-Denver Company, a corporation of Delaware
Filed June 19, 1961, Ser. No. 117,988
5 Claims. (Cl. 242—7)

This invention generally relates to devices for making electrical connections of the solderless wrapped type.

Electrical connections of this type have gained wide acceptance in the electrical industry, especially in the fabrication of wired panels requiring thousands of such connections upon closely spaced terminals. To facilitate rapid mass fabriction of such wired panels, automatic wiring machines have been developed to replace conventional hand operated wrapping tools. Automatic terminal wiring machines of this general character are disclosed in U.S. Patent No. 2,969,827, issued January 31, 1961, and in the copending application of Fred W. Loy; Serial No. 58,380, filed September 26,1960. After certain operational components of the aforementioned automatic machines, which are not the subject of this invention, have located the tool and its usual bit subassembly over an electrical terminal selected for wrapping and have properly fed a wire to the bit assembly, the bit is closed to seat the wire in the bit in a wrapping attitude with respect to the terminal. The closed bit is then advanced by other machine components to receive the selected terminal within an opening in the bit face; and, the bit is then rotated about the terminal by suitable motor means to apply the wire to the terminal in tightly wrapped, helical convolutions. The post wrapping operations of the tool typically include retraction of the bit from the terminal, actuation of the bit to the open position for receiving another conductor, angular indexing of the bit for proper orientation with respect to the feed path of the conductor, and deenergization of the bit rotation motor.

A broad object of this invention is to provide a wire wrapping tool having structural and operational characteristics which are well adapted to perform certain of the aforedescribed operations in an automatic wiring machine.

Another object of this invention is to provide a wrapping tool having improved means for carrying out certain of the aforedescribed operations of a bit subsassembly in such a manner that the speed of operation of wiring machines and the quality of electrical connections produced thereby may be substantially improved.

A specific object is the provision of a tool of the aforesaid general character having improved, positive acting means for opening and closing the bit subassembly. A related object lies in providing an adjustable opening and closing means which is cooperable with the bit subassembly for adjustably regulating the open and closed position thereof.

Another specific object is the provision of a wire wrapping tool having centering means for the bit and bit sleeve assembly whereby the assembly may be selectively held against oscillation as it is moved axially into engagement with an electrical terminal and thereafter released for gyratory motion about the terminal during the wrapping operation.

Yet another specific object is the provision of a wrapping tool of the aforedescribed general character including improved means for automatically indexing a rotary wrapping bit assembly upon completion of each wrapping cycle. A related object is to provide improved means for accurately adjusting the indexed position of the bit assembly.

Still another specific object is the provision of simplified means facilitating attachment and detachment of a wrapping bit subassembly to a wrapping tool.

Another specific object is to provide a wrapping tool which may be quickly and easily converted from clockwise rotation to counterclockwise rotation and vice versa.

A still more specific object is to provide a wrapping tool in which the above-stated objects are fully accomplished in a device characterized by compactness, portability, and simplicity of manufacture and maintenance.

These and other more specific objects and advantages will appear upon reading the following specification and claims and upon considering in connection therewith the attached drawings to which they relate.

In the drawings:

FIG. 1 is a front elevational view of a tool constructed in accordance with the present invention showing a longitudinal section through the bit centering device and a fragment of a tool carriage.

FIG. 2 is a side elevational view of the tool with a partial section showing details of a power cylinder;

Figure 3:
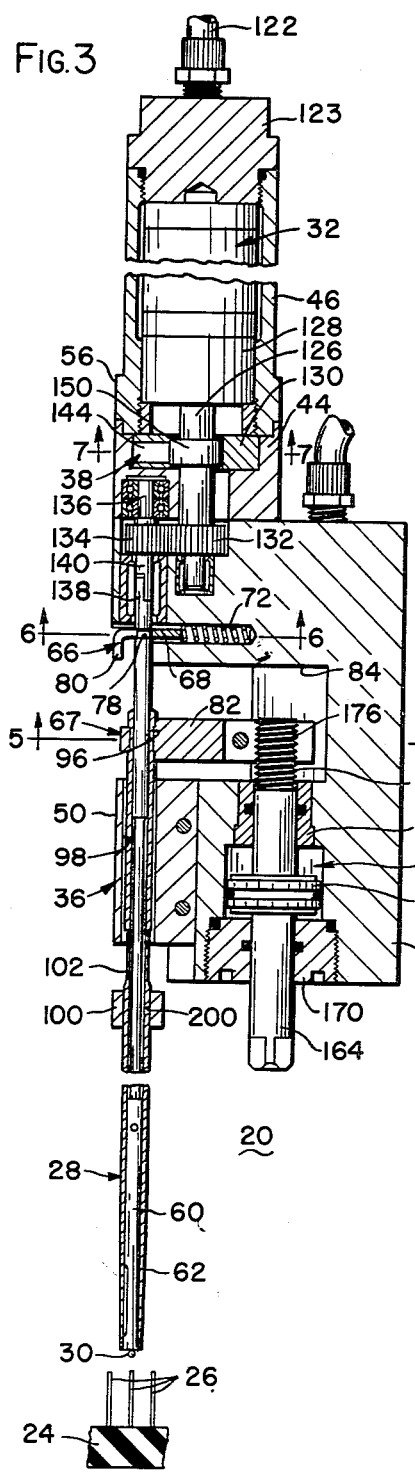
FIG. 3 is a longitudinal sectional view taken along lines 3—3 of FIG. 1 showing the tool dismantled from the carriage.

The present invention is embodied in a wire wrapping tool, indicated in its entirety by numeral 20, which is supported upon a tool support 22 of a wiring machine of the type which is the subject of U.S. Patent 2,969,827 and the copending application of Fred W. Loy, Serial No. 58,380. The indicated patent and application present detailed descriptions of wiring machines having suitable means for providing relative horizontal and vertical movement between a wrapping tool, such as tool 20, and an insulating panel, such as panel 24, having an array of electrical terminal posts 26 extending outwardly therefrom. In the following description of the invention, the tool support 22 preferably comprises a carriage which is adaped to move tool 20 horizontally and vertically with respect to the facing surface of a stationary panel 24. Neither the structure of the tool carriage 22 nor the means for actuating and controlling its movement is a subject of the present invention and will not be further described. It is sufficient to say that the carriage 22 is operable to locate the tool 20 over a selected terminal and to advance and to retract tool 20 relative to the selected terminal for a purpose to be described. It is to be further understod that the tool 20 is a component of an automatic wiring machine and functions to operate a wrapping bit subassembly 28 of such a machine for applying a flexible conductor 30 to an electrical terminal post 26 in tightly coiled convolutions.

Essentially, the operating elements of tool 20 comprise actuating and controlling means for the aforementioned bit assembly 28 and include a pressure fluid motor 32, and extensible power cylinder 34, a bit centering mehcanism 36, and a rotary indexing mechanism 38. As will be hereinafter more fully described, the motor 32 drives the bit assembly for reversible rotary movement, the power cylinder 34 is operable to open and close relatively movable elements of the bit assembly, the bit centering device 36 controls axial alignment and rotational stability of the bit assembly, and the indexing mechanism 38 returns the rotary bit assembly to a home position upon completion of each wrapping operation.

As shown in the drawings, the wrapping tool 20 includes a plural part tool housing comprising a reversed C-shaped main housing 42, a gear housing 44 and a motor housing 46 removably secured to the upper portion 48 of the main housing in stacked relationship, and a bit housing 50 removably secured to the lower portion 52 of the main housing. Threaded fasteners 54 penetrate a flange 56 on the lower end of motor housing 46 and the walls of gear housing 44 to maintain the motor housing, the gear housing and the main housing in proper assembled relation to each other. The bit housing 50 is mounted upon the main housing 42 by means of a pinned tongue and groove arrangement illustrated in FIG. 2. A similar tongue and groove construction is employed to mount the plural part tool housing upon the machine carriage 22 as shown in FIG. 2.

Figure 5:
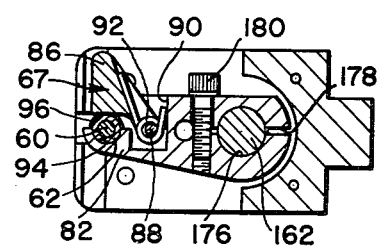
FIG. 5 is a transverse sectional view taken along lines 5—5 of FIG. 3.
Figure 6:
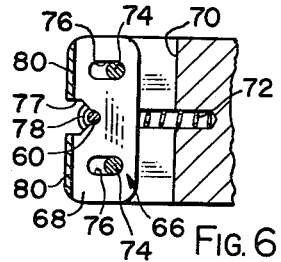
FIG. 6 is a transverse sectional view taken along lines 6—6 of FIG. 3.

The wrapping bit assembly 28 comprises a bit element 60 and a bit sleeve 62 surrounding the bit element. As shown in FIG. 2, the bit element and the sleeve are held in relatively reciprocable, but nonrotatable relationship by a pin and slot connection 64. The bit element and sleeve are respectively secured to portions of tool 20 by a shiftable latch 66 and a releasable lock 67. As seen in FIGS. 3 and 6, latch 66 comprises a latch plate 68 which is manually depressible inwardly into a transverse slot 70 in the upper portion 48 of the main housing 42 against the bias of a coiled compression spring 72. The plate 68 is guided for limited reciprocatory movement in slot 70 by a pair of pins 74 which penetrate elongated plate apertures 76. A stepped notch 77 in the outer end of plate 68 is formed for interfitting engagement with a groove 78 relieved in the upper end of bit element 60 and functions to lock the bit element against axial movement when the latch plate is extended. To release bit element 60 for downward extraction, downwardly bent portions 80 of plate 68 may be manually engaged and pressed inwardly from an outer biased position to move the interfering portion of notch 77 out of engagement with the bit element groove 78. As best illustrated in FIGS. 3 and 5, the releasable lock 67 for bit sleeve 62 is carried on the outer end portion of a linkage arm 82 disposed in the opening 84 defined by the C-shaped main housing 42. An inner portion of a locking finger 86 is pivotably mounted upon a pivot pin 88 within a recess 90 opening laterally from the linkage arm 82. As seen in FIG. 5, an enlarged outer portion of locking finger 86 is biased by a torsion spring 92 to pivot toward a facing semi-cylindrical groove 94 in the arm 82. When an upper circumferential groove 96 on the sleeve 62 is axially aligned with the arm groove 94, the torsion spring biases the locking finger 86 into the upper sleeve groove thereby releasably securing the sleeve against axial movement with respect to the linkage arm 82. FIGS. 1 and 3 show that the bit assembly 28 extends through a central bore 98 in the bit housing 50 with a loose fit therebetween and depends through an aligned bearing plate 100 extending from the bit housing. The bit sleeve 62 is provided with a lower circumferential groove 102 for a purpose to be hereinafter described.

Figure 11:
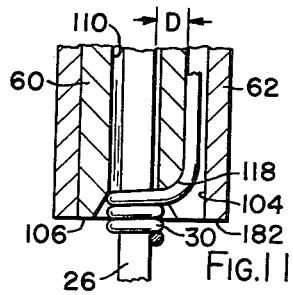
FIG. 11 is an enlarged fragmentary sectional view of the end portion of the wrapping bit assembly.
Figure 12:
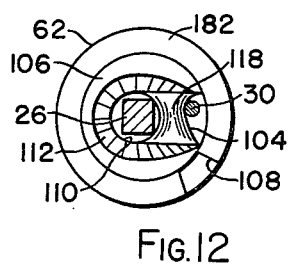
FIG. 12 is a bottom plan view of the bit assembly shown in FIG. 11.

The lower portions of the bit element 60 and the bit sleeve 62 are constructed in a conventional manner to provide side loading of a flexible conductor 30 into the bit assembly. As FIGS. 9 and 10 clearly demonstrate, axial shifting of the bit sleeve 62, by means to be described, closes the bit assembly and the transversely fed conductor 30 is bent rearwardly to seat an insulated portion in a groove 104 opening to the bit face 106 and to position a stripped portion substantially in parallel with the bit axis within a downwardly opening slot 108 in the sleeve 62. When the bit assembly is closed as shown in FIG. 10, the conductor 30 is held in the proper attitude for insertion of a terminal 26 into the bit element 60; and, subsequent rotation of the bit assembly wraps the conductor about the terminal in the manner shown in FIG. 11. Although the bit element per se is not a subject of this invention, a preferred bit face construction is shown in FIGS. 11 and 12. An eccentrically located terminal receiving bore 110 extends longitudinally into the lower end of bit element 60 and receives a suitable terminal 26. A generally U-shaped surface 112 provides means for guiding the terminal into bore 110 and for urging the convolutions of conductor 30 into intimate contact with the terminal. As the bit assembly is rotated about terminal 26, the conductor 30 is withdrawn from longitudinally extending, radially offset groove 104 and over a rounded surface 118 connecting the openings of groove 104 and bore 110. The tension placed upon conductor 30 as it is withdrawn from groove 104 downwardly over the rounded surface 118 tends to maintain the terminal in sliding contact with a wall portion of the bore 110 underlying the groove 104. It has been observed that uniform control of the wrapping tension of conductor 30 about terminal 26 is best achieved if the aforementioned sliding contact is maintained during wrapping rotation of the bit assembly. The accomplishment of this operational feature is an important aspect of this invention which will be hereinafter more fully explained in relation to the description of the aforementioned bit centering device 36.

Rotation of the bit assembly 28 is accomplished by means of the rotary motor 32 disposed in housing 46. The motor 32 is preferably of the conventional sliding vane type and is adapted for reversible rotation by pressure fluid, such as compressed air. The motor is connected to a source of compressed air by conduits 120 and 122 and by suitable passages, not shown, in a head 124 which closes the upper end of housing 46. The rotary output of motor 32 is drivingly connected to an indexing spindle 126 through a suitable speed reducing means, such as a conventional planetary gear mechanism 128. The indexing spindle 126 axially penetrates a ratchet plate 130; and, these elements coact with the motor 32 to comprise the aforementioned bit indexing mechanism 38, which will be more fully described. A spur gear 132 integrally formed near the lower end of indexing spindle 126 drivingly intermeshes with a spur gear 134 formed intermediate the ends of a spindle 136. As shown in FIG. 3, complementary notched portions 138 and 140 respectively formed on bit element 60 and bit spindle 136 cooperate for driving interengagement when the bit element is secured to tool 20 by the shiftable latch 66, as aforedescribed. As previously indicated, rotation of bit element 60 by motor 32 produces corresponding rotation of the bit sleeve 62.

Figure 7:
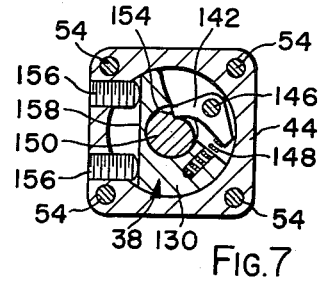
FIG. 7 is a transverse sectional view taken along lines 7—7 of FIG.3.
Figure 9:
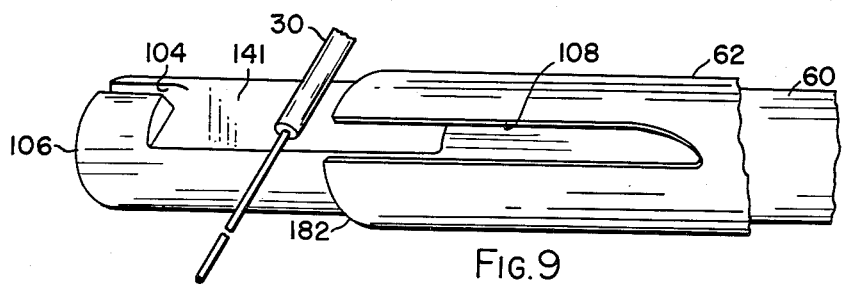
FIG. 9 is a fragmentary perspective view showing an end portion of a wrapping bit assembly in an open condition.
Figure 10:
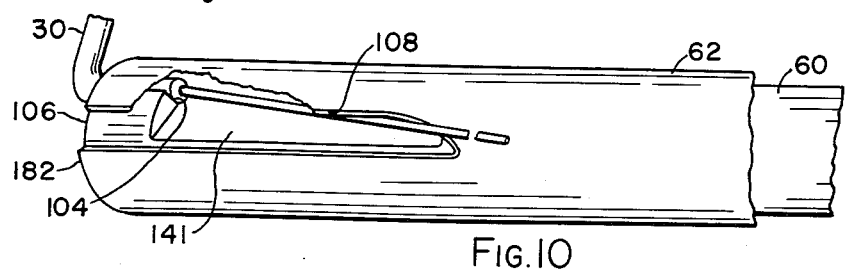
FIG. 10 is a view similar to FIG. 9 showing the bit assembly in a closed condition.

In automatic wiring machines of the type for which tool 20 is particularly well suited, wire feeding means, not shown, place a conductor, such as conductor 30, transversely of the bit element 60 in the attitude shown in FIG. 9. The usual construction and operating of side loading wrapping bits is such that proper conductor loading and subsequent closure of the bit sleeve 62, as shown in FIG. 10, can best be accomplished if a flat bit surface 141 over which the conductor 30 is fed is accurately oriented in parallelism with the fixed feed path of the conductor. Therefore, an important aspect of this invention is the accomplishment of accurate and positive bit indexing by means of the indexing mechanism 38. As best illustrated in FIGS. 3 and 7, a ratchet plate 130 is disposed in the central bore of the aforementioned gear housing 44. A pawl 142 is pivotally mounted within a radially opening recess 144 in plate 130 upon a pin 146. A coiled compression spring 148 resiliently urges pawl 142 into continuous bearing contact with a cam stop 150 formed on an enlarged intermediate portion of the indexing spindle 126. As the motor is rotated forwardly, or in the wrapping direction the pawl 142 and cam stop 150 produce a ratcheting action permitting free rotation of the bit assembly 28 and its driving elements. Upon completion of a wrap, reversal of motor 32 rotates the indexing spindle 126 until the pawl 142 strikes a laterally extending portion 154 of the cam stop 150 causing motor 32 to stall. Thereafter, the bit element is held positively in a rotary indexed position by the action of motor 38 tending to rotate the cam stop 150 into abutment with the pawl 142. The entire ratchet plate 130 is rotatable with respect to the surrounding gear housing 44; therefore, accurate adjustment of the angular position of the pawl 142 can be achieved by means of a pair of spaced set screws 156 which abut a flat 158 on one side of the ratchet plate 130. Alternative advancement and retraction of the set screws by a suitable tool is effective to precisely preset the stop position of the indexing spindle 126 and the angular home position of the aforementioned flat bit surface 141. Moreover, the described adjusting means for the indexing mechanism is externally accessible, thereby eliminating the need for disassembly of the tool 20 to gain access to conventional bit indexing means.

A double acting power cylinder, indicated generally by numeral 34, is housed in the main housing 42 in offset, parallel relation to the bit assembly 28. A piston 160 having upper and lower extending stem portions 162 and 164, respectively, is reciprocable within a cylindrical bore 166 defined in the main housing. The opposite ends of bore 166 are closed by a bushing 168 and a threaded cap 170; and, abutment of the piston 160 with bushing 168 and cap 170 limits the stroke of the piston 160. The power cylinder 34 is operable for reciprocatory movement by means of compressed air which is alternately supplied to and exhausted from the top and bottom of piston 160 by means of flexible conduits 172 and 174 and by passages, not shown, extending through housing 42 for suitably interconnecting the conduits with top and bottom portions of the bore 166. The upper piston stem 162 extends upwardly through bushing 168 in sealed relation thereto into threaded engagement with an internally threaded aperture 176 in the aforementioned linkage arm 82. As seen in FIG. 5, the aperture 176 is split by a slot 178 opening thereacross to the inner end of the linkage arm; and, a suitable clamping screw 180, disposed transversely of the slot, may be tightened or loosened to prevent or permit relative rotation of the threaded upper stem portion 162 within the threaded aperture 176. The lower piston stem 164 extends downwardly through the cap 170 in sealed relationship thereto and is provided with suitable tool flats at its lower extremity for a purpose to be described.

As previously indicated, the bit sleeve 62 is secured to the outer end of linkage arm 82 by means of a releasable lock 67; therefore, it will be apparent that alternate actuation of the power cylinder 34 between the conditions shown in FIGS. 2 and 3 will produce axial reciprocation of the bit sleeve with respect to the element 60 which is axially held by the shiftable latch 66. In this manner, the power cylinder 34 is effective to provide opening and closing movement of the bit assembly 28; and, the extent of opening of the bit sleeve 62 relative to the bit element 60 is determined by the length of the stroke of piston 160. Adjustment of the open and closed relationship between the bit element and the sleeve is accomplished by an important feature of this invention. Referring to FIG. 11, it will be noted that the extreme end surface 182 of the bit sleeve 62 is preferably in axial registration with the bit face 106 when the bit assembly is closed upon conductor 30. This preferred relationship of the relatively movable elements of the bit assembly should be carefully preset and maintained in order to prevent scuffing of the conductor, should the sleeve be extended too far, and to prevent improper seating of the conductor in the groove 104, should the sleeve be insufficiently extended. The preferred closed relationship of the bit element 60 and sleeve 62, just described, is produced by loosening the clamping screw 180 and thereafter rotating the piston 160 by means of the tool flats on the lower piston stem 164 to threadably adjust the axial position of the linkage arm 82 with respect to the upper piston stem 162.

Figure 8:
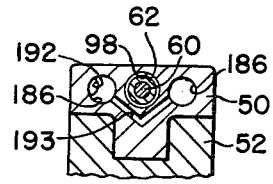
FIG. 8 is a fragmentary sectional view taken along lines 8—8 of FIG. 1.

Numeral 36 generally indicates a bit centering device comprising a bit housing 50, which is secured to the main housing 42, and an extensible bearing plate 100. As best illustrated in FIG. 1, the bearing plate is attached to the outer ends of a pair of pistons 184 which are reciprocably disposed in parallel cylindrical bores 186 longitudinally defined in the housing 50. The pistons 184 are actuated for extending the bearing plate 100, as shown in FIGS. 1, 2 and 3 by compressed air supplied to the upper ends of bores 186 through a conduit 188 attached to a hollow neck portion 190 of the housing 50. As viewed in FIG. 1, the left-hand bore 186 is directly connected to a passage 192 in neck portion 190 and the bores are interconnected by a V-shaped passage 193, as shown in FIG. 8. The bearing plate 100 is retractable to the position shown in FIG. 4 by means of a pair of coiled return springs 194 having their opposite ends seated between the bottoms of pistons 184 and the bottom of recesses 196 formed in bushings 198. From the foregoing it will be understood that the bearing plate 100 may alternately be pneumatically extended and resiliently retracted for reciprocating movement with respect to the bottom wall of the bit housing 50.

Figure 4:
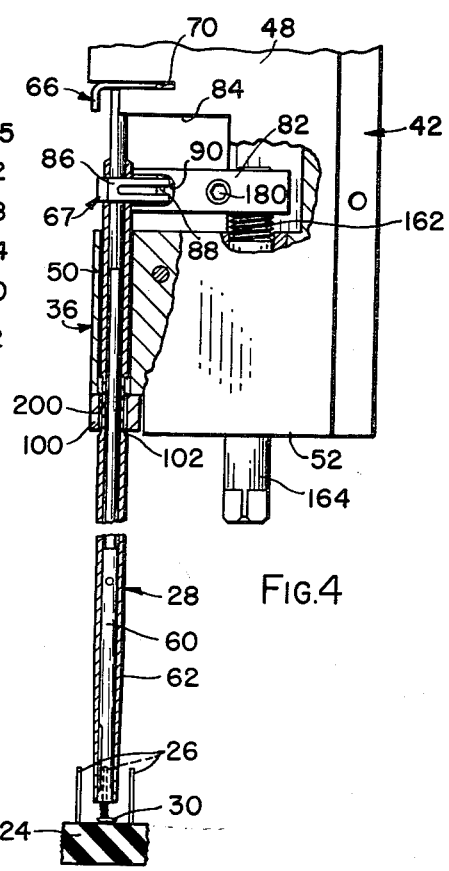
FIG. 4 is a fragmentary view of the tool shown in FIGS. 1, 2 and 3.

When the tool 20 has been located over a selected terminal, but prior to closing bit assembly 28 upon conductor 30, as shown in FIGS. 1 and 2, the bearing plate is extended and surrounds a longitudinal body portion of bit sleeve 62 lying below the aforementioned lower groove 102. A central aperture 200 in bearing plate 100 has an interior diameter substantially conforming to the exterior diameter of the bit sleeve for stabilizing the latter against lateral oscillation or drifting. In the condition shown in FIGS. 1 and 2 the bit assembly is held in the open position by the power cylinder 34; and, the greater portion of the lower sleeve groove 102 is disposed within the bore 98 of the bit housing 50. Closure of the bit assembly, as shown in FIG. 3, moves the greater portion of the lower sleeve groove 102 downwardly out of the bore 98, but not sufficiently to place the groove in registration with the aperture 200 in the extended bearing plate. Thus, in the closed bit condition, lateral drifting of the lower end of the bit assembly 28 is restrained by the bearing plate 100. The bearing plate is maintained in the extended condition as the tool 20 is moved downwardly by carriage 22 for insertion of the terminal 26 into the terminal receiving bore 110, as shown in FIG. 4. Thus, the bearing plate 100 functions to guide the aforementioned terminal receiving bore 110 of the bit element 60 for proper coaxial alignment with a terminal 26 as the tool 20 is lowered onto the terminal. Slight misalignment of the bit element 60 can, however, be corrected by the U-shaped guide surface 112 on the bit face 106 which tends to guide the terminal into the terminal receiving bore 110. As previously indicated, an essential feature of this invention is the provision of a bit centering device 36 which is operable to permit the interior wall of the eccentric terminal receiving bore 110 of bit element 60 to guide upon a terminal received therein as the bit element is rotated about the terminal during the wrapping operation. It will be appreciated that, if the bit element is rigidly restrained against lateral oscillation or drifting as it rotates about the terminal, the eccentricity of the terminal receiving bore 110, with respect to the rotary axis of the bit element, may produce lateral flexing of the terminal 26 or may cause the terminal to drift out of sliding contact with the wall portion of bore 110 underlying the groove 104. If the terminal is repeatedly flexed or bent during the wrapping operation, it may be fatigued to the breaking point or may be permanently bent out of alignment to such an extent that subsequent attempts to wrap other connections thereupon will be impossible due to severe misalignment of the terminal and receiving bore 110. If the terminal does not flex within bore 110 and the bit element is held against drifting, the distance D between the terminal and the bottom of the groove 104, indicated by FIG. 11, may vary as the interior wall of the eccentric bore 110 revolves about the terminal. As previously indicated, this variation of distance D may produce fluxuating degrees of tension in the conductor 30 as it is applied to the terminal with the result that the tightness of each convolution of wrapped wire will vary from place to place about the perimeter of the terminal. To obviate both of these undesirable results, the bit centering device 36 is retractable, as hereinafter described, to permit limited drifting or gyration of the lower end of the bit assembly 28 about the terminal during the wrapping operation. Following closure of the bit assembly 28 and downward movement of the tool 20 onto terminal 26, the piston bores 186 are exhausted by means of conduit 188 thereby permitting the compressed return springs 194 to move the bearing plate 100 to the position shown in FIG. 4. Such retraction brings the bearing plate aperture 200 into axial registration with the lower sleeve groove 102 which is reduced sufficiently in external diameter to eliminate the rigid guiding or stabilizing effect formerly obtained between the bearing plate and the body portion of sleeve 62. With the bearing plate retracted and the bit assembly freed for substantial radial movement, the cylindrical wall of the terminal receiving bore 110 constantly guides upon the terminal 26 in the manner shown in FIGS. 11 and 12, thereby maintaining the dimension D and uniform wrapping tension upon conductor 30. Moreover, since the bit element is free to drift or gyrate about the terminal, there is no tendency for the terminal to flex laterally or to otherwise be bent from its original aligned position.

After the connection is completely wrapped, the carriage 22 transports the tool 20 upwardly to disengage the bit element 60 from the terminal 26. The bit assembly 28 is opened by the power cylinder 34, the bearing plate 100 of the bit centering device 36 is extended by pistons 184, and the motor 32 is reversed for indexing the bit element 60 in the aforedescribed manner.

Figure 13:
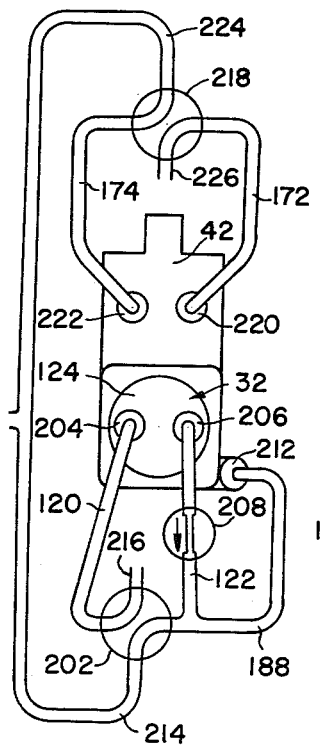
FIG. 13 is a diagrammatic representation of the fluid pressure supply circuit for a tool constructed in accordance with the present invention.

The hereinbefore described air motor 32, bit opening and closing power cylinder 34, and bit centering device 36 are each pneumatically operated to perform their respective bit controlling functions; and, FIG. 13 comprises a diagrammatic showing of suitable air circuit for these components of tool 20. A four-way valve 202 is operable in response to suitable actuating switches, not shown, included in an automatic wiring machine for supplying motive air to motor 32 and to the bit centering device 36. Valve 202 is connected to fittings 204 and 206 at the back head 124 of the motor 32 by conduits 120 and 122. A undirectional flow reducer 208 of any suitable type is disposed along conduit 122 between valve 202 and connection 206 for a purpose to be described. Conduit 188 which is in parallel with conduit 122 connects valve 202 to a fitting 212 on the outer end of the aforedescribed neck portion 190 of the bit centering device 36. With the valve 202 in the illustrated condition, motive air is supplied from a source, not shown, through a supply line 214 to conduit 122; and, conduit 120 is connected to an exhaust line 216 thereby energizing the motor 32 for reverse or indexing rotation. As previously indicated, reverse rotation of the motor 32 is arrested in an indexed condition by the indexing mechanism 38; therefore, the flow of air to the motor for reversing and for holding the bit assembly 28 in the indexed condition is preferably reduced by the flow reducer 208. It will be understood that full flow of motor exhaust air through the flow reducer 208 is obtained when the valve 202 is reversed to operate the motor at full power in the forward or wrapping direction. When the motor 32 is held in an indexed condition, the valve 202 also supplies motive air to the top of pistons 184 thereby extending the same together with the bearing plate 100 to support and guide the bit assembly 28 during downward movement of the same over a terminal 26.

A second four-way valve 218 is connected to fittings 220 and 222 by conduits 172 and 174. Actuation of valve 218 between opposite operating positions will alternately connect the top and the bottom of piston 160 to the supply line 224 and to an exhaust line 226 thereby reciprocating the power cylinder 34 for bit opening and closure. To illustrate the functioning of valves 202 and 218, assume that the carriage 22 has positioned the tool 20 for a wrapping operation, as shown in FIGS. 1 and 2. In the valve condition shown in FIG. 13, the motor is reversed for indexing the bit assembly 28, the bearing plate 100 is extended for supporting the bit assembly 28, and the bit sleeve 62 is in the open position with respect to the bit element 60. After conducter 30 is fed across bit element 62, valve 218 is operated from the illustrative condition to close the bit assembly 28 upon the conductor 30, as shown in FIG. 3. The tool 20 is moved down upon terminal 26 by certain machine elements, not shown, and valve 202 is then reversed to exhaust the bit centering device 36 for retraction of plate 100 to the position shown in FIG. 4 and to connect the motor for forward, wrapping rotation. Upon completion of the wrapping operation, the tool 20 is carried upwardly by carriage 22 and valves 202 and 218 are returned to the illustrated condition to open the bit assembly 28, to extend the bearing plate 100 and to reverse motor 32 for rotation of the bit assembly to an indexed position.

In certain instances it may be desirable to reverse the direction of rotation of the wrapping bit assembly 28. In the present tool such an operational result is quickly and easily accomplished by changing a small number of parts and certain air line connections. The direction of the rotation of the motor may be changed by reversing the conduits 204 and 206 and transferring the flow reducer 208 to the other conduit. The indexing mechanism 38 is converted for indexing in the opposite direction by inverting the ratchet plate 130 and substituting an indexing spindle 126 having an appropriately formed cam stop 150 thereon. Finally, the bit assembly 28 is detached from tool 20 and is replaced by a bit assembly having a bit face adapted for wrapping in the opposite direction.

It will be understood that the above description and accompanying drawings comprehend only the general and preferred embodiment of the present invention and that various changes in construction, proportion and arrangement of parts may be made without departing from the spirit of the invention as set forth in the appended claims.

Having fully disclosed the invention, we claim:

1. In a wiring device comprising a rotary tool for wrapping a conductor upon an electric terminal, in combination: a tool housing; rotary motor means mounted on said housing; a bit assembly rotatably and recipro-cably operable for engaging a conductor to wrap the same about a terminal in helical convolutions; said bit assembly being rotatably attached to said housing and including bit means drivingly connected to said motor means and an elongated bit sleeve having a circumferential groove relieved intermediate the ends of the body portion thereof; centering means attached to said housing having an extensible member closely surrounding said bit sleeve and selectively registrable with said groove and said body portion to control the stability of said bit assembly about its longitudinal axis.

2. The combination according to claim 1, wherein said extensible member is extendable by means of at least one pneumatically operated cylinder disposed in said centering means.

3. The combination according to claim 1, wherein said extensible member is retractable with respect to said sleeve by resilient means disposed in said centering means thereby to place said member in axial registration with said groove thereby facilitating gyratory movement of said bit assembly about its longitudinal axis.

4. In a wiring device comprising a rotary tool for wrapping a conductor upon an electric terminal, in combination: tool housing means; rotary motor means mounted on said housing means; a bit assembly drivingly connected to said motor means and operable for engaging a conductor and for wrapping the same about a terminal in helical convolutions; said bit assembly comprising a rotatable bit element attached to said housing and a bit sleeve coaxially surrounding said bit elements in relatively axially reciprocable, but nonrotatable relation thereto; double-acting pressure fluid actuated piston means disposed in said housing means in off-set, parallel relation with said bit sleeve for axially reciprocating the latter relative to said bit element between limiting relative axial positions; said bit sleeve and said bit element having corresponding end surfaces in axial registration when said bit sleeve is operated to one of said limiting relative axial positions; linkage means transversely connecting said piston means and said bit sleeve and being threadably adjustable with respect to said piston means to preadjust the axial relationship between said bit element and said bit sleeve thereby to establish and maintain the aforesaid axial registration.

5. In a wiring device comprising a rotary tool for wrapping a conductor upon an electric terminal, in combination: tool housing means; rotary motor means mounted on said housing means; a bit assembly drivingly connected to said motor means and operable for engaging a conductor and for wrapping the same about a terminal in helical convolutions; said bit assembly comprising a rotatable bit element and a bit sleeve coaxially surrounding said bit element in axially reciprocable relation thereto; power means disposed in said housing means in offset relation with said bit sleeve for axially reciprocating the latter relative to said bit element between limiting axial positions; said bit sleeve and said bit element having end surfaces in axial registration when said bit sleeve is operated to one of said limiting axial positions; linkage means connecting said power means and said bit sleeve and being adjustable with respect to said power means to preadjust the axial relationship between said bit element and said bit sleeve thereby to establish and maintain the aforesaid axial registration.

References Cited in the file of this patent
UNITED STATES PATENTS

| 1,219,078 | Calahan | Mar. 13, 1917 |
| 2,251,701 | Dixon | Aug. 5, 1941 |
| 2,884,685 | Bos et al. | May 5, 1959 |
| 2,885,764 | Shulters et al. | May 12, 1959 |